(12) United States Patent
Rousseau et al.

(10) Patent No.: US 6,776,951 B2
(45) Date of Patent: Aug. 17, 2004

(54) METHOD OF MAKING ELECTRET FIBERS

(75) Inventors: Alan D. Rousseau, Stillwater, MN (US); Joel W. Miller, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 268 days.

(21) Appl. No.: 09/962,746

(22) Filed: Sep. 25, 2001

(65) Prior Publication Data

US 2002/0041045 A1 Apr. 11, 2002

Related U.S. Application Data

(60) Continuation of application No. 09/484,654, filed on Jan. 18, 2000, now Pat. No. 6,319,452, which is a division of application No. 08/941,945, filed on Oct. 1, 1997, now Pat. No. 6,213,122.

(51) Int. Cl.$^7$ .............................. D01D 5/08; D01F 1/09; D06M 10/00
(52) U.S. Cl. ...................... 264/464; 264/40.1; 264/103; 264/211; 264/555
(58) Field of Search ............................. 264/40.1, 103, 264/211, 464, 555

(56) References Cited

U.S. PATENT DOCUMENTS

| | | |
|---|---|---|
| 4,215,682 A | 8/1980 | Kubik et al. |
| 4,275,718 A | 6/1981 | Jungmann |
| RE30,782 E | 10/1981 | van Turnhout et al. |
| RE31,285 E | 6/1983 | van Turnhout et al. |
| 4,536,440 A | 8/1985 | Berg |
| 4,588,537 A | 5/1986 | Klaase et al. |
| 4,592,815 A | 6/1986 | Nakao |
| 4,798,850 A | 1/1989 | Brown |
| 4,807,619 A | 2/1989 | Dyrud et al. |
| 4,827,924 A | 5/1989 | Japuntich |
| 4,886,058 A | 12/1989 | Brostrom et al. |
| 4,950,549 A | 8/1990 | Rolando et al. |
| 5,025,052 A | 6/1991 | Crater et al. |
| 5,099,026 A | 3/1992 | Crater et al. |
| 5,325,892 A | 7/1994 | Japuntich et al. |
| 5,411,576 A | 5/1995 | Jones et al. |
| RE35,062 E | 10/1995 | Brostrom et al. |
| 5,472,481 A | 12/1995 | Jones et al. |
| 5,496,507 A | 3/1996 | Angadjivand et al. |
| 5,525,397 A | 6/1996 | Shizuno et al. |
| 5,645,627 A | 7/1997 | Lifshutz et al. |
| 5,780,153 A | 7/1998 | Chou et al. |
| 5,908,598 A | 6/1999 | Rousseau et al. |
| 5,919,847 A | 7/1999 | Rousseau et al. |
| 5,968,635 A | 10/1999 | Rousseau et al. |
| 5,976,208 A | 11/1999 | Rousseau et al. |
| 6,002,017 A | 12/1999 | Rousseau et al. |
| 6,068,799 A | 5/2000 | Rousseau et al. |
| 6,119,691 A | 9/2000 | Angadjivand et al. |
| 6,213,122 B1 | 4/2001 | Rousseau et al. |
| 6,214,094 B1 | 4/2001 | Rousseau et al. |
| 6,237,595 B1 | 5/2001 | Rousseau et al. |
| 6,238,466 B1 | 5/2001 | Rousseau et al. |
| 6,261,342 B1 | 7/2001 | Rousseau et al. |
| 6,268,495 B1 | 7/2001 | Rousseau et al. |

FOREIGN PATENT DOCUMENTS

| | | |
|---|---|---|
| EP | 0 616 831 A1 | 9/1994 |
| WO | WO 95/05232 A1 | 2/1995 |
| WO | WO 96/26783 A1 | 9/1996 |
| WO | WO 96/28597 A1 | 9/1996 |
| WO | WO 97/07272 A1 | 2/1997 |

OTHER PUBLICATIONS

Katritzky, Alan R., "Design and Synthesis of Novel Fluorinated Surfactants for Hydrocarbon Subphases", *Langmuir*, vol. 4, pp. 732–735 (1988).

Van Wente, "Superfine Thermoplastic Fibers", *Ind. Eng. Chem.*, vol. 48, pp. 1342–1346 (1956).

U.S. Ser. No. 09/484,654 to Rousseau et al., filed Jan. 18, 2000.

U.S. Ser. No. 09/416,216 to Eitzman et al. filed Oct. 8, 1999.

U.S. Ser. No. 09/415,291 to Eitzman et al. filed Oct. 8, 1999.

U.S. Ser. No. 09/415,566 to Angadjivand et al. filed Oct. 8, 1999.

U.S. Ser. No. 09/111,833 to Angadjivand et al. filed Sep. 2, 1997.

U.S. Ser. No. 09/109,497 to Jones et al. filed Jul. 2, 1998.

U.S. Ser. No. 09/478,652 to Jones et al. filed Jan. 6, 2000.

U.S. Ser. No. 09/478,658 to Jones et al. filed Jan. 6, 2000.

U.S. Ser. No. 09/625,801 to Jones et al. filed Jul. 26, 2000.

*Primary Examiner*—Leo B. Tentoni
(74) *Attorney, Agent, or Firm*—Karl Hanson

(57) ABSTRACT

A method of making electret fibers, which method comprises:

extruding a polymeric material to create fibers; and
imparting an electric charge to the fibers;
wherein the resulting fibers have a level of extractable hydrocarbon material that is less than 3.0 weight percent, based on the weight of the fibers.

19 Claims, 1 Drawing Sheet

METHOD OF MAKING ELECTRET FIBERS

This is a continuation of Application Ser. No. 09/484,654, filed Jan. 18, 2000, now U.S. Pat. No. 6,319,452, which is a divisional of Application Ser. No. 08/941,945 filed Oct. 1, 1997, now U.S. Pat. No. 6,213,122.

The present invention pertains to electret fibers and electret filter media made of fibers such as melt-blown polymer microfibers and methods of making electret fibers and filters. More specifically, the invention pertains to electret fibers containing a low level of extractable hydrocarbon material. The level of extractable hydrocarbon material is a function of the polymer selected and the processing conditions employed to make the fibers and filters.

BACKGROUND

Electret articles comprise a dielectric material exhibiting a persistent or quasi-permanent electrical charge. See G. M. Sessler, Electrets, Springer Verlag, N.Y. (1987). The articles are commonly used in the form of fibrous filtering webs for applications, and processes for making electret nonwoven fibrous filter webs are very well known. For example, nonwoven webs can be made from polymers using melt-blowing techniques, such as those described in Van Wente, "Superfine Thermoplastic Fibers," *Ind. Eng. Chem.*, vol. 48, pp. 1342–46, (1956), and an electric charge can be imparted in the web using various techniques. (See U.S. Pat. Nos. 4,215,682; 4,588,537; 5,411,576 and 5,472,481; 5,645,627; 5,496,507; and WO 97/07272).

Because of the importance of air filtration and the desirable properties that electret filter webs have shown in filter applications, considerable efforts have been devoted to improving the performance of fibrous electret filters. The above-cited patents reflect some of the work that has been reported to improve electret filter performance, and what follows is a brief summary of these contributions.

Kubik and Davis in U.S. Pat. No. 4,215,682 imparted an electric charge in melt-blown fibers by bombarding the fibers with electrically charged particles as the fibers issued from a die orifice.

Klaase et al. in U.S. Pat. No. 4,588,537 injected charge into an electret filter using a corona treatment.

Jones et al. in U.S. Pat. Nos. 5,411,576 and 5,472,481, disclose electret filters that are made by extruding a blend of polymer with a melt-processable fluorochemical in a microfibrous web. The resulting web is annealed and corona treated.

Lifshutz et al. in U.S. Pat. No. 5,645,627 (WO 96/26783) makes electret filters by extruding a blend of polymer with a fatty acid amide or a fluorochemical oxazolidinone or a mixture of these, in a microfibrous web, followed by annealing and corona treating the resulting web.

Angadjivand et al. in U.S. Pat. No. 5,496,507 indicate that impinging water droplets onto a nonwoven microfiber web imparts a charge to the web.

Rousseau et al. in WO 97/07272 disclose electret filters that are made by extruding blends of a polymer with a fluorochemical or organic triazine compound into a microfiber web, followed by impinging water droplets onto the web. This publication indicates that use of these additives results in improved charge when the web has been impinged by water droplets.

Although the above documents disclose a variety of methods for improving electret filter performance, the previous efforts have nonetheless left room for further contributions and the invention described below is yet another discovery directed toward the ongoing effort of establishing better electret fibers and filters.

SUMMARY OF THE INVENTION

The present invention provides electret fibers and filters comprised of a polymeric material and a fluorochemical additive. The fibers have less than about 3 weight percent of extractable hydrocarbon material based on the weight of the fibers. The level of extractable hydrocarbon material is measured by extracting the fibers in $CHCl_3$ for 10 minutes at room temperature and measuring the amount of material that has dissolved out from the fibers.

The inventive fibers having less than about 3 weight percent of extractable hydrocarbon material can be made by a process of blending a polymer with a fluorochemical additive compound, extruding the blend at a temperature maintained below 290° C. to form extruded fibers, and annealing and charging the extruded fibers.

The present inventors have discovered that there is a correlation between the level of extractable hydrocarbon material found in an electret filter and the filter's loading performance. Surprisingly, the inventors discovered that the lower the level of extractable hydrocarbons in the extruded web, the better the loading performance of the web (loading performance involves a filter's ability to remove an oily aerosol from a gas stream and is described in detail in the Examples section). An electret filter web's performance thus can be predicted by measuring the level of extractable hydrocarbons.

The extractable hydrocarbon level in the extruded web is a function of polymer type and processing conditions used to make the web. Selecting the correct polymer type can be important to achieve a low level of extractable hydrocarbon material in the filter web's fibers. Harsh processing conditions such as peroxide use and high extrusion temperatures should be avoided because they can increase extractable hydrocarbons and cause a corresponding decrease in loading performance. Thus, controlling the foregoing parameters can result in a filter web exhibiting improved loading performance.

The electret fibers and filters of the present invention find multiple uses including, but not limited to, use in: respirators such as face masks, home and industrial air-conditioners, air cleaners, vacuum cleaners, medical and other air line filters, and air conditioning systems in vehicles and electronic equipment such as computers and disk drives.

DETAILED DESCRIPTION OF PREFERRED EMBODIMENTS

Figure 1:
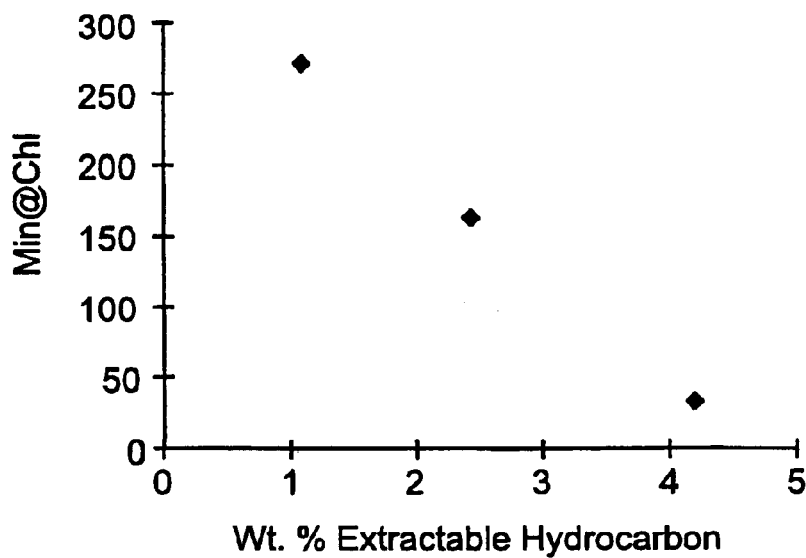
FIG. 1 shows a plot of aerosol loading performance as measured by the minimum at challenge—that is, the mass of dioctylphthalate (DOP) incident on a filter web at the point where the DOP Percent Penetration reaches a minimum value, hereinafter "Min@Chl"—of three filter web samples containing different weight percents of extractable hydrocarbon material. As explained in detail in the Examples section, this data was obtained by exposing the filter webs to a DOP liquid aerosol in an instrument that measures the concentration of DOP liquid aerosol upstream and downstream to the filter. The Percent Penetration is calculated by dividing the aerosol concentration downstream by the concentration upstream and multiplying by 100.
Figure 2:
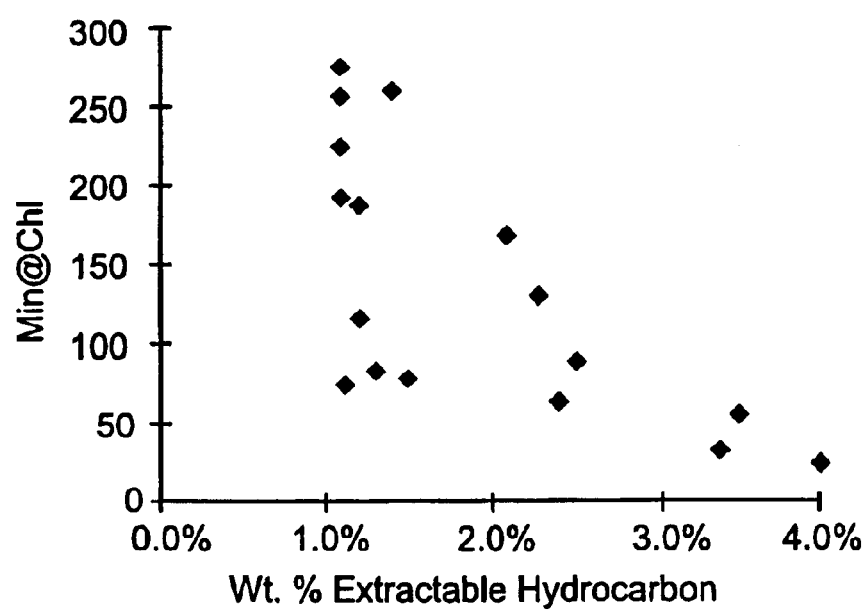
FIG. 2 shows a plot of aerosol loading performance as measured by Min@Chl for 17 samples containing different weight percents of extractable hydrocarbon material.

The polymeric material used in the invention is selected such that, after being extruded and converted into an electret fiber under selected conditions, the electret fibers have a low level of extractable hydrocarbon. The polymeric material can be a nonconductive thermoplastic resin—that is, a resin having a resistivity greater than $10^{14}$ ohm.cm. Preferred polymeric materials have a resistivity greater than $10^{16}$ ohm.cm. The polymeric material should have the capability of possessing a persistent or long-lived trapped charge. It is contemplated that the polymers are selected, as described below, by routine experimentation to determine those exhibiting low levels of extractable hydrocarbons. The polymeric material may include, but is not necessarily limited to, polyolefins such as polyethylene and polypropylene, poly-4-methyl-1-pentene, polyvinylchloride, polystyrene, polycarbonate and polyester and combinations of these polymers.

Polypropylene is a preferred polymer because of polypropylene's high resistivity, its ability to form melt-blown fibers and its satisfactory charge stability, hydrophobicity, and resistance to humidity. Examples of preferred polypropylenes include Escorene PP-3505G (100% isotactic polypropylene, density 0.91 g/cc, melt index 400 g/10 min, m.p. 160° C.), available from Exxon Corporation; and Fina 3860 (density 0.905 g/cc, melt index 100 g/10 min, m.p. 165° C.), available from Fina Oil and Chemical Company.

Fluorochemical additives useful in the present invention can provide water repellency to fibers. The fluorochemical additives are desirably melt processable—that is, they suffer substantially no degradation under the melt processing conditions that are used to form the fibers. The fluorochemical additive should be solid at 25° C. and preferably has a melting point of at least about 70° C., more preferably at least about 100° C. The fluorochemical additive preferably exhibits no phase transitions in the range of commonly encountered temperatures, i.e., about 0 to 80° C. as such changes in molecular freedom may adversely affect charge stability. The fluorochemical additive preferably has a molecular weight of about 500 to 2500, more preferably about 800 to 1500. The fluorochemical additive preferably is substantially free from mobile polar and/or ionic species, contaminants and impurities that could increase the electrical conductivity or otherwise interfere with the fiber's ability to accept and hold electrostatic charges.

Preferred fluorochemical additives include, for example, fluorochemical oxazolidinones as described in U.S. Pat. No. 5,025,052 to Crater et al., fluorochemical piperazines as described in Katritzky, Alan R. et al., "Design and Synthesis of Novel Fluorinated Surfactants for Hydrocarbon Subphases," *Langmuir*, vol. 4, pp. 732–735, (1988), and perfluorinated alkanes preferably having about 10 to 50 carbon atoms, more preferably about 15 to 30 carbon atoms. The fluorochemical additive preferably is present in amounts of up to 10 weight percent, more preferably about 0.4 to 5 weight percent, most preferably about 0.5 to 2 weight percent. Especially preferred fluorochemical additives are those described in Jones et al., U.S. Pat. No. 5,411,576.

In a method of producing the inventive fibers, the polymer and fluorochemical additive are blended before extruding. The blending step can be conducted by blending the solids before adding them to the extruder but are preferably separately melted and blended together as liquids. More preferably, the fluorochemical additive is blended in a first extruder in an amount of about 10 to about 20 weight percent when using propylene to form the fibers. This relatively high fluorochemical-content molten blend is fed into a second extruder that contains molten polypropylene without a fluorochemical. The resulting blend is then extruded into fibers.

The extruders preferably are twin screw extruders. Temperature during extrusion should be controlled to provide desired melt rheology and avoid flourochemical thermal degradation. Preferably the temperature during extrusion is maintained below 290° C. Extrusion temperatures above 290° C. can cause the level of extractables to rise above 3 percent and cause a corresponding decrease in loading performance. More preferably the time at high temperature is minimized by introducing the blend of the polymer melt with 10–20 percent fluorochemical at about 210° C. at a point near the end of the second extruder.

The molten polymer can be made into fibers using known or later developed fiber-forming methods, including spinning or melt-blowing. The melt-blowing technique has been originally described by Van Wente, "Superfine Thermoplastic Fibers" *Ind. Eng. Chem.*, vol. 48, pp. 1342–46, (1956), and uses gas streams to draw fibers out from an extruder orifice. The melt-blowing method is desirable for its ability to efficiently produce fine fibers that can easily be collected as a nonwoven web—that is handleable by itself. The fibers obtained by melt-blowing are known as blown microfibers or BMF. The extruded fibers may be collected in the form of a nonwoven web by known methods including, but not limited to, collecting BMF as described in Van Wente, "Superfine Thermoplastic Fibers."

The fibers or the nonwoven web can be annealed in order to increase the electrostatic charge stability in the final product, particularly stability to liquid aerosols. Preferably, the fluorochemical is a substance that presents low energy surfaces and the annealing step is conducted at a sufficient temperature and for a sufficient time to cause the fluorochemical to bloom to the interfaces (e.g., the fiber surface or boundaries between crystalline and amorphous phases within the fiber) of the fibers. Generally, higher annealing temperatures reduce annealing times. Preferably, annealing is conducted at about 130 to 155° C. for about 2 to 20 minutes, more preferably at about 140 to 150° C. for about 2 to 10 minutes, and most preferably at about 150° C. for a period of about 4.5 minutes Annealing temperatures above about 155° C. are generally undesirable because the fibers or web can be damaged.

The fibers are then electrostatically charged. Examples of electrostatic charging method useful in the present invention are described in U.S. Pat. Nos. Re. 30,782 to van Turnhout, Re. 31,285 to van Turnhout, U.S. Pat. No. 4,275,718 to Wadsworth et al., U.S. Pat. No. 4,588,537 to Klaase et al., and U.S. Pat. No. 4,592,815 to Nakao. Fibers can be hydrostatically charged, and cut fibers can be tribocharged by rubbing or by shaking with dissimilar fibers. See, for example, U.S. Pat. No. 4,798,850. Preferably, the web is subjected to a corona discharge or pulsed high voltage as described in the patents cited in the Background section.

The electret fibers and filters of the present invention exhibit low extractable hydrocarbon levels. Preferably, the web has about 1.0 to 3.0 weight percent extractable hydrocarbon material, more preferably about 1.0 to 2.5 weight percent, and most preferably about 1.0 to 1.5 weight percent. Hydrocarbons are compounds made up of only carbon and hydrogen and in the present invention can, include small amounts of oxygen such as might be introduced by a peroxide. Extractable hydrocarbon material is calculated as follows.

A sample of a collection of fibers, such as a nonwoven web, is prepared for extractable hydrocarbon material analysis by weighing 50 milligrams (mg) of the web into a four dram (16 milliliters (ml)) vial, adding 10 ml of chloroform to the vial and shaking the sealed vial for 10 minutes on an automatic shaker (such as a wrist action shaker) at room temperature. The amount of extracted hydrocarbon is quantified by an appropriate technique such as high performance liquid chromatography (HPLC). The extracted fluorochemicals elute at different times than the extracted hydrocarbons and can be quantified separately. The weight percent extractable hydrocarbon material does not include the weight of extractable fluorochemicals. To obtain weight percent extractable hydrocarbon material, the weight of the extracted hydrocarbon material is divided by the weight of the fibers (50 mg) and multiplied by 100.

Fibers for fibrous electret filters of the invention typically have an effective fiber diameter of from about 5 to 30 micrometers, and preferably from about 6 to 10 micrometers as calculated according to the method of Davies, "The Separation of Airborne Dust and Particulates," Institution of Mechanical Engineers, Proceedings 1B, (1952).

Electret fibers resulting from the processes described above may be formed into an electret filter. An electret filter can take the form of a nonwoven web containing at least some electret fibers, or electret fibers combined with a supporting structure. In either case, the electret article can be combined with some nonelectret material. For example, the supporting structure can be nonelectret fibers or supporting nonelectret, nonwoven webs. The electret filter is preferably a nonwoven electret web containing electrically-charged, melt-blown microfibers.

Electret filter webs may also include staple fibers that generally provide a loftier, less dense web. Methods of incorporating staple fibers in the nonwoven web can be carried out as described U.S. Pat. No. 4,118,531 to Hauser. If staple fibers are used, the web preferably contains less than 90 weight percent staple fibers, more preferably less than 70 weight percent. For reasons of simplicity and optimizing performance, the electret web may in some instances consist essentially of melt-blown fibers and does not contain staple fibers.

The electret filter may further contain sorbent particulates such as alumina or activated carbon. The particulates may be added to the filter to assist in removing gaseous contaminants from an airstream that passes through the filter. Such particulate loaded webs are described, for example, in U.S. Pat. No. 3,971,373 to Braun, U.S. Pat. No. 4,100,324 to Anderson and U.S. Pat. No. 4,429,001 to Kolpin et al. If particulate material is added, the web preferably contains less than 80 volume percent particulate material, more preferably less than 60 volume percent. In embodiments where the electret filter does not need to remove gaseous contaminants, the filter may contain only melt-blown fibers.

The electret filter should be substantially free of components such as antistatic agents that could increase the electrical conductivity or otherwise interfere with the fibers' ability to accept and hold electrostatic charge. Additionally, the electret filter should not be subjected to treatments such as exposure to gamma rays, UV irradiation, pyrolysis, oxidation, etc., that might increase electrical conductivity. Thus, in a preferred embodiment the electret filter is not exposed to gamma irradiation or other ionizing radiation.

The electret filters typically have a basis weight of about 10 to 500 grams per meter squared (g/m$^2$), more preferably about 10 to 100 g/m$^2$. Filters that are too dense may be difficult to charge while those that are too light or too thin may be fragile or have insufficient filtering ability. For many applications the electret filters are about 0.25 to 20 millimeters (mm) thick, and commonly about 0.5 to 2 mm thick. Electret filters of these sizes may be particularly useful in a respirator.

In respirators, the fibrous electret webs may be specially shaped or housed, for example, in the form of molded or folded half-face masks, replaceable cartridges or canisters, or prefilters. Respirators may also have additional features such as additional layers, valves, molded face pieces, etc. Respirator examples that can incorporate the improved electret filters of the invention include those described in U.S. Pat. Nos. 4,536,440, 4,827,924, 5,325,892, 4,807,619 4,886,058 and U.S. patent application Ser. No. 08/079,234.

The following examples show that webs having a relatively low concentration of extractable hydrocarbon material exhibit higher loading performance than webs having relatively high concentrations of extractable hydrocarbon material. The level of extractable hydrocarbon material found in a web is a function of the polymer and the process conditions used to make the web. Because the level of extractable hydrocarbon in the web influences the web's loading performance, this parameter can be controlled by polymer selection and the processing conditions employed in making the web.

EXAMPLES

General Sample Preparation

Extrusion of Webs

Polypropylene BMF webs containing a fluorochemical melt additive were extruded using a two extruder process. The fluorochemical melt additive was fed into the throat of a twin screw extruder along with polypropylene resin to produce a melt stream that contained about 11 weight percent fluorochemical. The bulk of the polypropylene resin was added to the throat of a second twin screw extruder. In some cases, a peroxide was also metered in to reduce viscosity. The output of the fluorochemical-containing extruder was pumped into the polypropylene-containing extruder at a rate such as to make the total output about 1.1 percent by weight fluorochemical melt additive.

For consistency and control of variables. the additive used in every sample was additive A of U.S. Pat. No. 5,411,576 having the formula

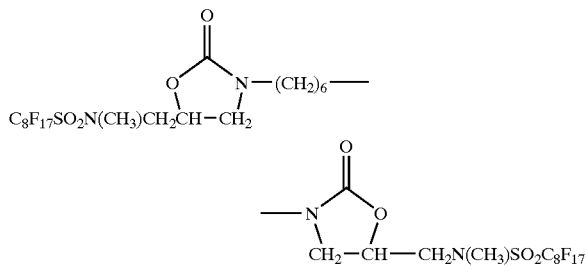

The melt stream temperature containing the fluorochemical melt additive was maintained below 290° C. at all points. The final melt temperature was 288° C. The extrusion conditions for the main polymer melt stream, upstream to where the fluorochemical was introduced, were adjusted to produce the desired properties in the extruded webs. When low melt index resins were used or extrusion rates were increased to more than 50 pounds per hour, (2,5-dimethyl-2,5-ditert-butylperoxy)hexane was co-fed into the extruder to control the polymer's melt rheology and the physical parameters of the melt blown web. The web itself was produced in a conventional manner similar to that described in Van Wente, et. al. except that a drilled orifice die was used. Webs were made to one of the web specifications (Web Spec) below unless otherwise indicated.

| Web Spec | Basis Weight (g/m$^2$) | Pressure Drop (mmH$_2$O) | Thickness (mm) |
|---|---|---|---|
| 1 | 60.7 | 4.4 | 1.27 |
| 2 | 71.4 | 7.0 | 1.35 |
| 3 | 58.2 | 4.1 | 1.32 |
| 4 | 59.0 | 5.8 | 1.21 |
| 5 | 70.9 | 4.1 | 1.38 |
| 6 | 85.5 | 7.9 | 1.59 |

Annealing

The extruded webs were further treated by passing through an oven at an average temperature of about 150° C. at a rate that the dwell time in the oven was about 4.5 minutes. This annealing process caused additional polymer crystallization and caused the fluorochemical melt additive to bloom the fiber surfaces.

Charging

The webs were corona charged using a high voltage electric field provided between 30 linear cross-web corona sources and a ground electrode having a corona current of $2.6 \cdot 10^{-3}$ milliamps/cm of corona source length and a residence time of about 15 seconds.

DOP Loading Test

The dioctylphthalate (DOP) loading measurement is performed by monitoring the penetration of DOP aerosol through a sample during prolonged exposure to a controlled DOP aerosol. The measurements are made with a TSI Incorporated Automated Filter tester (AFT) model #8110 or #8130 adapted for DOP aerosol.

The DOP % Penetration is defined as follows:

DOP % Penetration=100(DOP Conc. Downstream/DOP Conc. Upstream), where the concentrations upstream and downstream are measured by light scattering chambers. The concentrations are measured and the DOP % Penetration is calculated automatically by the AFT. The DOP aerosol generated by the 8110 and 8130 AFT instruments is nominally a monodisperse 0.3 micrometers mass median diameter and has an incident (upstream) concentration of 100 milligrams per cubic meter as measured by a standard filter. The samples tested were all tested with a flow rate through the filter web sample of 85 liters per minute (l/min). All samples reported here were tested with the aerosol ionizer turned off. The samples tested were discs 5.25 inches (13.34 cm) in diameter with an area 4.5 inches (11.43 cm.) In diameter exposed. The face velocity was 13.8 cm/sec.

The sample discs were weighed and then two of the discs were stacked directly on top of each other and mounted in the AFT. Each test was begun and continued until there was a clear trend for increasing DOP % Penetration with continued DOP aerosol exposure or at least until an exposure to 200 milligrams of DOP. The DOP % Penetration and corresponding Pressure Drop data were transmitted to an attached computer where they were stored. After the termination of the DOP loading test, the loaded samples were weighed again to monitor the DOP amount collected on the fibrous web samples. This was used as a cross-check of the DOP exposure extrapolated from the measured DOP concentration incident on the fibrous web and the measured aerosol flow rate through the web.

The resulting loading data was imported into a spread sheet to calculate the Minimum @ Challenge (Min@Chl). The Min@Chl is defined to be the total DOP challenge or mass of DOP which has been incident on the filter web at the point where the DOP % Penetration reaches its minimum penetration. This Min@Chl is used to characterize web performance against DOP loading, the higher the Min@Chl the better the loading performance.

Determination of Extractable Hydrocarbons

Web samples were prepared for analysis by weighing 50 milligrams (mg) of web into a 4 dram vial, adding 10 ml of chloroform to the vial and then sealing the vial with a Teflon lined cap. The vial was shaken for 10 minutes on a wrist action shaker, and the extract was analyzed by HPLC under the following chromatographic conditions:

Column: Alltech CN 5 $\mu$m, ×150 mm

Solvent A: Hexane

Solvent B: 5% Methanol in methylene chloride

Gradient: 10% B to 100% B in 20 minutes

Flow Rate: 0.25 ml/min

Injector: 2 $\mu$L

Detector: Evaporative Light Scattering Detector, gain×8

A polypropylene standard (weight average molecular weight of 830, number average molecular weight of 740) from American Polymer Standard Corp. was used to make up a series of polypropylene standard solutions in chloroform in the concentration range of 1000 to 60 micrograms per milliliter ($\mu$g/ml). These standard solutions were analyzed and a calibration curve was calculated from the linear regression analyses of the log concentration versus log chromatographic area. This calibration curve was then used to determine the level of hydrocarbon material (in this case, polypropylene) extracted from the web samples.

Examples 1–3

FIG. 1

BMF web was prepared from various polypropylene resins and the fluorochemical melt additive Additive A in U.S. Pat. No. 5,411,576 at a rate of 50 lb/hr and an extrusion temperature of 288° C. The webs were made to have the parameters in Web Specification 1. Peroxide was added to the Fina 3860 resin to control melt rheology. After annealing and charging the web as described above, DOP load testing was performed on at least sixteen 5.25 inch samples taken from across and down the web for each of Examples 1–3. The weight percent extractable hydrocarbon material was determined for samples from the same webs using the HPLC technique described above. The measurements of weight percent extractable hydrocarbon material were more precise (within 5% precision) than the Min@Chl measurements. Therefore only about 2 extraction measurements were conducted for each example while at least 16 samples were tested to obtain the Min@Chl value for each of Examples 1–3. The loading performance and extraction data are set forth in Table 1 and plotted in FIG. 1.

TABLE 1

| Example Number | Resin Type | Wt. % Extractable Hydrocarbon Material | Min @ Ch1 |
|---|---|---|---|
| 1 | Exxon Escorene 3505G 400 melt index | 1.0 | 270 |

TABLE 1-continued

| Example Number | Resin Type | Wt. % Extractable Hydrocarbon Material | Min @ Ch1 |
|---|---|---|---|
| 2 | Fina 3860 100 melt index | 2.4 | 163 |
| 3 | Fina HMF 3860 (E0D 94-18) 400 melt index | 4.2 | 34 |

As illustrated by the data in Table 1 and FIG. 1, liquid aerosol loading performance, as measured by Min@Ch1, correlates inversely with increasing weight percent extractable hydrocarbon in the webs. The lower the level of extractable hydrocarbon the greater the value of the Min@Chl.

Examples 4–17

Additional webs were prepared as described above and according to the and web specifications set forth in Table 2.

TABLE 2

| Example No. | Polymeric Material | Extrusion Rate, lb/hr | Web Spec | Peroxide |
|---|---|---|---|---|
| 4 | Exxon 3505G | 50 | 1 | No |
| 5 | Fina 3860 | 50 | 1 | Yes |
| 6 | Fina HMF 3860 | 50 | 1 | No |
| 7 | Exxon 3505G | 50 | 2 | No |
| 8 | Fina HMF 3860 | 50 | 2 | No |
| 9 | Exxon 3505G | 75 | 2 | Yes |
| 10 | Fina 3860 | 75 | 2 | Yes |
| 11 | Exxon 3505G | 100 | 2 | Yes |
| 12 | Fina HMF 3860 | 100 | 2 | Yes |
| 13 | Exxon 3505G | 50 | 2 | No |
| 14 | Exxon 3505G | 50 | 3 | No |
| 15 | Exxon 3505G | 50 | 4 | No |
| 16 | Exxon 3505G | 50 | 5 | No |
| 17 | Exxon 3505G | 50 | 6 | No |

Examples 4–17 were annealed and corona charged and load tested as described above for Examples 1–3 except that only three samples from each web were tested and averaged to obtain the Min@Chl. The weight percent of extractable hydrocarbon was also determined as described above for each example including remeasuring the webs Examples 1–3 to insure precise extraction values among Examples 1–17 and to compensate for any changes in column conditions that may have occurred between the initial testing of Examples 1–3 and the testing of Examples 1–17. The weight percent extractable hydrocarbon material and Min@Chl for Examples 1–17 are presented in Table 3 and plotted in FIG. 2.

TABLE 3

| Example No. | Wt % Extractable Hydrocarbon | Min @ Ch1 |
|---|---|---|
| 1 | 1.1 | 270 |
| 2 | 2.1 | 163 |
| 3 | 3.4 | 34 |
| 4 | 1.1 | 250 |
| 5 | 2.3 | 124 |
| 6 | 3.5 | 57 |
| 7 | 1.1 | 220 |
| 8 | 2.5 | 87 |
| 9 | 1.5 | 78 |
| 10 | 2.4 | 62 |
| 11 | 1.3 | 83 |
| 12 | 4.0 | 23 |
| 13 | 1.1 | 71 |
| 14 | 1.4 | 260 |
| 15 | 1.2 | 112 |
| 16 | 1.1 | 188 |
| 17 | 1.2 | 183 |

The data in Table 3 and FIG. 2 show the general trend that increasing levels of extractable hydrocarbons correlate generally with decreasing loading performance (i.e., decreasing Min@Chl). Values for several of the examples deviate from the linear relationship illustrated in FIG. 1. This deviation is believed to be due, at least in part, to larger experimental error of the Min@Chl data resulting from measuring fewer samples for Examples 4–17 (Min@Chl values for Examples 1–3 were the result of averaging measurements from 16 samples while Min@Chl values for Examples 4–17 were the result of averaging the measurements of only 3 samples).

As shown in Table 3 and FIG. 2, the filter webs with the highest weight % extractable hydrocarbons, Examples 3, 6 and 12, having 3.4%, 3.5% and 4.0% extractable hydrocarbons respectively, exhibited the poorest loading performance, having Min@Chl values of 34, 57 and 23 respectively. Thus, the data shows that filter webs with more than about 3.0 weight percent extractable hydrocarbon material have undesirable loading performance.

Examples 1, 4, 7, 14, 16 and 17 having weight % extractable hydrocarbon material of 1.1, 1.1, 1.1, 1.4, 1.1, and 1.2%, respectively, demonstrated the best loading performance as shown by their respective Min@Chl values of 270, 250, 220, 260, 188 and 183. Thus, the data in Table 3 and FIG. 3 show that the best loading performance is obtained for webs having about 1.0 to 1.5 weight percent extractable hydrocarbons.

The data also illustrate the importance of selecting the proper polymer to prepare the electret fibers and nonwoven webs. All the examples that used Fina HMF 3860 polypropylene, Examples 3, 6 and 12, had the highest levels of extractable hydrocarbon material and exhibited the poorest loading performance as evidenced by their Min@Chl values.

The references, including U.S. patents, that are mentioned herein are incorporated by reference as if reproduced in full below. In describing preferred embodiments of the present invention specific terminology has been employed for the sake of clarity. The invention, however, is not intended to be limited to the specific terminology so selected, and it is to be understood that each specific element includes all technical equivalents that operate similarly to accomplish a similar purpose. It is therefore to be understood that, within the scope of the appended claims and their equivalents, the invention may be practiced otherwise than as specifically described.

What is claimed is:

1. A method of making electret fibers, which method comprises:

extruding a polymeric material at a temperature maintained below 290° C. to create fibers; and imparting an electric charge to the fibers;

wherein the extruded, electrically-charged fibers have a level of extractable hydrocarbon material that is less than 3.0 weight percent, based on the weight of the fibers.

2. The method of claim 1, wherein the fibers have fluorine atoms present at the surface of the fibers.

3. The method of claim 2, wherein the fibers are extruded through use of a melt-blowing step.

4. The method of claim 3, wherein the meltblown fibers are microfibers that have an effective fiber diameter of from about 5 to 30 micrometers.

5. The method of claim 2, wherein corona charging is used to impart electric charge to the fibers.

6. A method of making electret fibers, which method comprises the steps of:

providing meltblown polymeric microfibers that have an effective fiber diameter of about 5 to 30 micrometers;

causing fluorine atoms to be present at the surface of the melt-blown microfibers; and imparting electric charge to the extruded fibers through use of at least corona discharge;

wherein meltblown microfibers have a level of extractable hydrocarbon material that is less than about 3.0 weight percent based on the weight of the fibers.

7. The method of claim 1, wherein the level of extractable hydrocarbons is 1.0 to 3.0 weight percent.

8. The method of claim 1, wherein the level of extractable hydrocarbons is 1.0 to 2.5 weight percent.

9. The method of claim 1, wherein the level of extractable hydrocarbons is 1.0 to 1.5 weight percent.

10. The method of claim 1, wherein the electric charge is imparted to the fibers by a pulsed high-voltage.

11. The method of claim 1, wherein the electric charge is imparted to the fibers by contacting the fibers with water.

12. The method of claim 1, wherein the polymeric material comprises polypropylene.

13. The method of claim 1, wherein the fibers are microfibers that have an effective fiber diameter of 6 to 10 micrometers.

14. The method of claim 13, wherein the microfibers are meltblown fibers.

15. The method of claim 1, wherein the fiber, are extruded to create a nonwoven web of microfibers, the nonwoven web of fibers having an electric charge imparted thereto and being placed in a filter of a respirator.

16. A method of making electret fibers, which method comprises:

extruding a polymeric material to create fibers; and imparting an electric charge to the fibers;

wherein the extruded, electrically-charged fibers have a level of extractable hydrocarbon material that is less than 3.0 weight percent, based on the weight of the fibers, and wherein the fibers have fluorine atoms present at the surface of the fibers.

17. The method of claim 16, wherein the fibers are extruded through use of a melt-blowing step.

18. The method of claim 17, wherein the meltblown fibers are microfibers that have an effective fiber diameter of from about 5 to 30 micrometers.

19. The method of claim 16, wherein corona charging is used to impart electric charge to the fibers.

* * * * *

UNITED STATES PATENT AND TRADEMARK OFFICE
CERTIFICATE OF CORRECTION

PATENT NO. : 6,776,951 B2
DATED : August 17, 2004
INVENTOR(S) : Rousseau, Alan D.

It is certified that error appears in the above-identified patent and that said Letters Patent is hereby corrected as shown below:

Column 4,
Line 44, after "minutes" insert -- . --.
Line 64, after "can" delete ",".

Column 6,
Line 43, delete "." and insert therefore -- , --.

Column 7,
Line 19, after "passing" insert -- them --.
Line 21, after "rate" insert -- such --.

Column 8,
Line 23, delete "gainx8" and insert therefore -- gain = 8 --.

Column 9,
Line 25, after "the" insert -- conditions --.

Signed and Sealed this

Twenty-ninth Day of March, 2005

JON W. DUDAS
*Director of the United States Patent and Trademark Office*